US006835828B2

(12) United States Patent
Sears et al.

(10) Patent No.: US 6,835,828 B2
(45) Date of Patent: Dec. 28, 2004

(54) ALKYLENE OXIDE MODIFIED HARDWOOD CELLULOSE

(75) Inventors: Karl D. Sears, Jesup, GA (US); Wendy Hendricks, Jesup, GA (US)

(73) Assignee: Rayonier Inc., Jacksonville, FL (US)

( * ) Notice: Subject to any disclaimer, the term of this patent is extended or adjusted under 35 U.S.C. 154(b) by 0 days.

(21) Appl. No.: 10/616,045

(22) Filed: Jul. 8, 2003

(65) Prior Publication Data

US 2004/0106786 A1 Jun. 3, 2004

Related U.S. Application Data

(63) Continuation of application No. 09/943,650, filed on Aug. 31, 2001, now abandoned.

(51) Int. Cl.$^7$ ................................................. C08B 3/06
(52) U.S. Cl. .............................. 536/69; 536/56; 536/58; 536/63; 536/123.1; 536/124; 536/70; 536/95; 536/128
(58) Field of Search .............................. 536/69, 56, 58, 536/63, 123.1, 124, 70, 95, 128

(56) References Cited

U.S. PATENT DOCUMENTS

| 3,148,106 A | 9/1964 | Mitchell | .................. 162/18 |
| 4,399,275 A | 8/1983 | Sears | ..................... 536/70 |

OTHER PUBLICATIONS

J.L. Riley, Modified Cellulose Fibers and Derivatives, ACS Symposium Series 58, ACS, Washington D.C. pp. 125–151 (1977).
S.A. Rydholm, Pulping Processes, Interscience Publishers, pp. 143–145 (1965).
Sears, K.D., Hinck, J.F. and Sewell, C.G., Journal of Applied Polymer Science, vol. 27, pp. 4599–4610 (1982).

*Primary Examiner*—James O. Wilson
*Assistant Examiner*—Michael C. Henry
(74) *Attorney, Agent, or Firm*—Kramer Levin; Naftalis & Frankel LLP

(57) ABSTRACT

Disclosed is a process for producing reactive cellulose for use in the manufacture of cellulose acetate having superior clarity by mercerizing hardwood cellulosic material and reacting it with an hydroxyalkylating agent to a degree of molar substitution ranging from 0.04 to 0.15 per anhydroglucose unit in cellulose.

15 Claims, No Drawings

US 6,835,828 B2

ALKYLENE OXIDE MODIFIED HARDWOOD CELLULOSE

This application is a Continuation of application Ser. No. 09/943,650, filed Aug. 31, 2001 now abandoned.

FIELD OF THE INVENTION

This invention relates to a process for the modification of cellulose and particularly to a process for the preparation of reactive cellulosic hardwood pulp to make cellulose acetate with superior properties.

BACKGROUND OF THE INVENTION

Considerable effort has been expended to improve the reactivity of cellulose so as to decrease the manufacturing costs of cellulose derivatives. One known approach to achieving such a goal is the treatment of cellulosic pulp in the presence of an alkali with an alkylene oxide to produce a trace substituted hydroxyethylated pulp. Such a process was disclosed, for example, by J. L. Riley in Solvent Spun Rayon, Modified Cellulose Fibers and Derivatives, edited by A. F. Turbak, ACS Symposium Series 58, ACS, Washington, D.C. page 149 (1977). While some improvement in reactivity has been achieved by this reaction, the improvement was not sufficient to economically justify its use. The process, for example, does not improve the reactivity of cellulose in "low catalyst" acetylation processes, widely used for the preparation of cellulose acetate.

The treatment of cellulose with alkali under "mercerizing conditions" is a well known procedure which converts cellulose from its native form, cellulose I, to a more thermodynamically stable, less crystalline form, cellulose II. The critical concentration of the caustic solution (weight % of the solution of sodium hydroxide or, less often, potassium hydroxide) necessary for mercerization is dependent upon both temperature and type of cellulose. However, in general, the caustic solution strength for mercerizing conditions at ambient temperatures will be more than 5%, and usually about 6–16%. For a given caustic concentration, mercerization occurs more readily at low temperatures than high. At a given temperature, such as 0° C., a greater caustic concentration is required to mercerize a prehydrolyzed kraft pulp than a sulfite pulp, for example. The conditions (temperature, caustic concentration) required to mercerize various cellulosic materials are well known.

Because it is less crystalline and more amorphous, mercerized cellulose would presumably be more readily accessible to reagents. Unfortunately, mercerized pulps are relatively inert to acetylation as a consequence of structural collapse in the interfibrillar spaces upon drying. Thus, the prior art initially taught that just enough alkali should be used to refine cellulose during alkaline bleaching stages, but that the caustic amount and temperatures used should be insufficient to produce mercerizing conditions in the production of acetate grade pulps.

Early attempts to improve cellulose reactivity by hydroxyalkylation scrupulously avoided mercerizing conditions. Such conditions are well known and well defined in the cellulose industry. See, for example, Pulping Processes, S. A. Rydholm, Interscience Publishers, 1965, pages 143–145. In the alkylene oxide treatment of cellulose disclosed in the above identified publication by J. L. Riley, only a 2% solution of sodium hydroxide, based on pulp, was used to promote the reaction at ambient temperatures. This is well below the concentration of sodium hydroxide necessary for mercerizing pulp.

A prior attempt to produce a modified cellulose pulp which would be reactive in low catalyst acetylation reactions is described in U.S. Pat. No. 4,399,275. It focused on the use of softwood cellulose pulps. According to the process of U.S. Pat. No. 4,399,275, softwood cellulose is mercerized in conventional fashion to convert cellulose I to cellulose II and then alkylene oxides are reacted with the mercerized softwood pulp fibers. The patentee discovered that the alkylene oxides appeared to "wedge open" the mercerized softwood fibers, so that they did not collapse upon drying and, as a result, maintained a high level of reactivity in subsequent low catalyst acetylation processes.

Propylene oxide was found to be the preferred alkylene oxide for making mercerized softwood fibers which are reactive in low catalyst acetylation processes with desirable properties being achieved with hydroxypropoxy group ($-OC_3H_6OH$) content range of 3.6 to 5.7%, corresponding to a degree of molar substitution (d.s.) of 0.08 to 0.13 per anhydroglucose unit in cellulose.

Although the softwood cellulosic materials produced according to U.S. Pat. No. 4,399,275 were extremely reactive in acetylation reactions, it was found that to achieve commercially acceptable haze levels for most products, mercerized softwood pulp had to be reacted with undesirably large amounts of alkylene oxide. For example, at least 15% by weight of propylene oxide based on oven-dried (o.d.) pulp weight was required to achieve acceptable cellulose acetate properties. In order to achieve substantially improved triacetate haze values, it was determined that treatment with about 20% by weight propylene oxide based on o.d. pulp weight was necessary. Further, the modified cellulose pulps produced according to this patent were so highly reactive in known low catalyst acetylation processes as to require special cooling equipment to slow down the acetylation reaction to avoid damaging conditions.

Because of the special processing equipment required to moderate the acetylation reaction for alkylene oxide modified softwood pulps, and because of the relatively large amounts of alkylene oxide required to produce softwood pulps which would enable the manufacture of cellulose acetate products having desirable low haze levels, commercial interest never developed in the process of U.S. Pat. No. 4,399,275.

Accordingly, there exists a need for a modified cellulose pulp which is reactive to acetylation using standard low catalyst acetylation processes, but which is not so reactive in such processes as to require special equipment to moderate the acetylation reaction. Further, it would be desirable if such a modified cellulose pulp could be made without consuming large amounts of expensive reagents as to make the manufacture of such pulp cost prohibitive. Finally, the acetylation of a modified cellulose pulp should yield cellulose acetate products having low haze levels, so that they will be suitable for use in commercial applications having stringent haze requirements, such as in viewing screens for flat panel monitors.

It is accordingly a primary object of the present invention to provide a process for the preparation of modified cellulose having only moderate acetylation reactivity, specifically reactivity that is similar to that expected from a standard acetate wood pulp.

It is an additional object of this invention to provide a process for producing cellulosic pulps which will significantly improve the properties of cellulose acetate derived from them.

It is a more specific object of this invention to provide a cellulosic wood pulp which might improve levels of cellulose acetate production and reduce costs to manufacture superior cellulose acetate products when compared, for example, to use of alternate cellulosic materials such as high purity cotton linters.

SUMMARY OF THE INVENTION

The foregoing and other objects of the invention are achieved by the preparation of reactive cellulose by mercerizing hardwood cellulosic material, and reacting the mercerized hardwood cellulose with an hydroxyalkylating agent to a molar degree of substitution of the cellulose ranging from about 0.04 to about 0.15 per anhydroglucose unit in cellulose, the degree of substitution being insufficient to render the cellulose appreciably soluble in water, and recovering the substantially water insoluble product. The hardwood sources which are suitable for use in the invention are woods such as gum, maple, oak, eucalyptus, poplar, beech and aspen.

The hydroxyalkylating agents useful in the invention are generally the alkylene oxides, including ethylene, propylene and butylene oxides and halogen substituted alkylene oxides such as epichlorohydrin. Benefits of the invention are achieved with about 2.0% to about 5.5% by weight hydroxyalkoxy (—$OC_nH_{2n}OH$) group content on the cellulose. This corresponds to a degree of molar substitution per anhydroglucose unit in cellulose of from about 0.04 to about 0.15. Because introduction of hydroxypropoxy (—$OC_3H_6OH$) groups using propylene oxide is more efficient in promoting the benefits of the invention, and also represents a safer, less costly process, it is a preferred alkylene oxide for use in the invention. For propylene oxide, benefits can be expected in about the 2.5 to 4.0% hydroxypropoxy (—$OC_3H_6OH$) group content range which corresponds to a degree of molar substitution of about 0.055 to 0.09 per anhydroglucose unit in cellulose.

It is principally in the substitution ranges set forth above for hardwoods that fiber inactivation resulting from the mercerization process is overcome. This has been observed as a marked reduction in the haze levels of cellulose acetate dopes produced with the reactive cellulose pulps of the invention and also in a marked reduction of color in the acetate dopes.

In the practice of the invention, the hardwood cellulosic pulp may be pretreated with NaOH which acts both to mercerize the pulp and as a catalyst for the reaction of cellulose with alkylene oxides. Normally, hydroxyalkylation will be conducted at the same caustic solution concentration as the mercerizing reaction, although it need not. Solution concentrations from 1 to 40% may be used for hydroxyalkylation. Certain bleaching and refining operations for cellulosic pulps involve a cold caustic extraction stage utilizing from 6 to 16% caustic solution at ambient temperatures (about 5° to about 40° C.) to extract hemicelluloses. During the cold caustic extraction stage, mercerization occurs. It has been found that reactive cellulosic pulps of acetylation quality may be produced by combining into one integral operation the cold caustic extraction stage using mercerizing conditions with alkylene oxide modification of the pulp.

In theory from 6 to 40% caustic solution may be used to mercerize the pulp. In practice, however, a preferred method of carrying out the present invention is to first conduct a cold caustic extraction using from 8 to 20%, and preferably 10 to 16%, caustic solution at a temperature of from 15° to 35° C., preferably 23° to 25° C., at a low consistency (weight of pulp per total weight of pulp slurry) of from 1 to 10%, preferably about 3%. The pulp slurry should then be dewatered to a high consistency of from about 10 to over 50%, preferably over 25%, using a centrifuge and/or press and then reacted with an alkylene oxide in the gas phase (25° C. for ethylene oxide, 50° C. for propylene oxide) before rinsing and further processing In industrial practice, the consistency should be increased as high as possible (to about 50% or more) to minimize side reactions of alkylene oxides with water. During reaction with alkylene oxide, the caustic concentration should preferably remain at the mercerizing level, i.e., at 6 to 40%, preferably 8 to 20% caustic. A cold caustic refining process, of the type which typically may be used in the practice of the present invention, is more fully disclosed in U.S. Pat. No. 3,148,106. Reference to the foregoing patent should be made for a more complete description of such a refining process.

A wide variety of hardwood cellulosic material, principally pulps, are useful in the practice of the present invention, including both prehydrolyzed kraft and sulfite pulps. While the process is preferably combined with a refining operation, the process is nevertheless useful for both bleached and unbleached pulps. The invention is particularly useful for the preparation of acetate grade pulps. However, the reactive pulps of the invention may be used for the manufacture of other cellulose derivatives and plastics, including other cellulose esters and cellulose ethers such as ethyl cellulose.

Conventional acetylation processes used for the preparation of cellulose acetate involve both high and low acid catalyst reactions. The present process leads to acetate quality pulps which are reactive in both high and low catalyst processes. The reactive cellulosic pulps of the invention show substantially improved acetate filterability levels compared to standard acetylation grade pulps. Thus, cellulosic pulps prepared in accordance with the invention can lead to significantly improved levels of acetate production.

When a hardwood prehydrolyzed kraft pulp was mercerized by cold caustic extraction using 10% NaOH, followed by reaction with 10% propylene oxide (PO) based on o.d pulp, and the fibers were subjected to low catalyst acetylation after washing and drying, the reaction rates of the modified pulp were found to be substantially the same as normal hardwood prehydrolyzed kraft acetate pulp. Further, the triacetate and diacetate haze values of treated pulp were found to be far superior to those of a standard hardwood acetate grade wood pulp (e.g., Sulfatate H-J, a prehydrolyzed kraft pulp available from Rayonier Performance Fibers Division of Jesup, Ga.). Color values were also superior.

These results were highly surprising since much faster reactivity was expected based on U.S. Pat. No. 4,399,275, and the haze and color values achieved with the hardwood pulp were much better than were achieved with softwood pulp in that patent.

The same procedure was evaluated utilizing 16% NaOH, and reaction with 10% PO, and the resulting product gave even better haze values, and similar reactivities. The triacetate haze values achieved with 16% NaOH mercerization were as low as the clarity values generally obtained when cotton linters are used to make cellulose acetate.

Control pulps mercerized with both 10 and 16% NaOH cold caustic extractions, but not PO modified, gave triacetate haze results that were poor.

Reaction with levels of PO in the 10–15% range gave haze results that were far better than Sulfatate-H-J, a standard hardwood acetate pulp which is generally regarded as one of the best acetate pulps in the industry.

It was surprisingly found that at equivalent PO treatment levels of mercerized pulps, softwoods give much higher acetate reactivity, but much higher haze levels; whereas, similar treatment of hardwood pulps gives acetylation times that are much more normal, but with superb haze results. The latter have considerable market value, and were achieved at levels of PO treatment which were more economic than the higher PO treatment levels which are necessary to achieve modified softwood pulps with acceptable haze values. Excellent benefits are clearly obtained in the 2.9–3.7% hydroxypropoxy content range (d.s. of 0.064–0.082) with no significant improvements observed for moving to higher levels of substitution. This favorably contrasts with d.s. levels of 0.08–0.13 required to achieve benefits utilizing softwoods.

The very low triacetate haze (or clarity) values achieved utilizing hardwood pulp in accordance with the invention are equivalent to those from cotton linters pulp. Due to the excellent triacetate clarity values of cotton linters, compared to those attainable from commercial wood cellulose acetate pulps, cotton linters have been the preferred source material for premium acetate end-use markets, such as liquid crystal displays (LCDs). The PO modified, mercerized hardwood pulps according to the invention can compete in this market and also in manufacture of high quality triacetate film for professional photography.

Another benefit of using the modified hardwood pulps of the invention is that they react faster than cotton linters in low catalyst acetylation reactions.

The below examples are illustrative of the process of the present invention.

DESCRIPTION OF THE PREFERRED EMBODIMENTS

EXAMPLE 1

A cellulosic pulp (272 g, 100 g oven dried—o.d.) which had never been previously dried was prepared from hardwood (a mixture of principally gum, oak and maple) by a steam prehydrolyzed kraft cooking process and several bleach stages prior to cold caustic extraction (CCE) in a 10% NaOH solution at 3.0% consistency (100 g o.d. pulp in 3233.3 g of 10% NaOH solution). The pulp was slurried for 10 minutes at a temperature of 24–25° C. before its recovery in a small-scale centrifuge for 10 minutes to remove filtrate and recover 348.5 g of alkaline pulp stock. This entire process was repeated two more times using 100 g o.d. of starting pulp to attain a total of 1021.6 g of stock. The stock was subdivided into four equal portions of about 66 g o.d. equivalent (255.4 g) based on the starting combined pulp weight of 300 g. Each batch was shredded in a Waring blender for about 24 seconds total time (3×8 seconds) prior to placement in 2 liter, heavy duty plastic containers which were then flushed with nitrogen for one minute. Propylene oxide (6.6 g) was placed into each of the four containers which were then sealed and placed in a heated roller cabinet for 1.25 hours at 50° C. Based on the total o.d. weight of the starting pulp after extraction (66 g×4=264 g total), a total of 26.4 g of PO was added (6.6 g×4), or 10% by o.d. pulp weight. After removal from the roller cabinet, each stock was quenched by addition of large quantities of water and allowed to cool before processing.

The treated pulps were then processed at ambient temperatures by slurrying in water followed by recovery and numerous water washes in a Buchner funnel. The pulps were then reslurried in water, and acidified to pH between 2.5–3.0 with dilute sulfuric acid, and stirred for at least five minutes before recovery in a Buchner funnel and numerous water washes. All four similarly processed stocks from the plastic reaction vessels were combined and slurried together prior to recovery, sheeting, and drying to recover 306.3 g of stock at 89% o.d., or overall yield from starting pulp of 90.1%. The pulp had a hydroxypropoxy content of 2.9%.

EXAMPLE 2

Example 1 was repeated but 16% NaOH solution was used for CCE rather than 10% NaOH. The PO treatment level was again 10%, being based on the o.d. pulp weight of the cold caustic extracted stock. Overall pulp product yield from starting stock was about 90.7%. The resulting pulp had a hydroxypropoxy content of 3.3%.

EXAMPLE 3

Example 2 was repeated, except that 12.5% PO was added rather than 10%. The overall pulp product yield was about 90.9% from starting stock. The resulting pulp had a hydroxypropoxy content of 3.7%.

EXAMPLE 4

Example 2 was repeated, except that 15% PO was added rather than 10%. Overall pulp product yield was about 91.0%. The resulting pulp had a hydroxypropoxy content of 4.5%.

EXAMPLES 5 & 6

For comparative purposes, control pulp samples (not reacted with PO) were prepared by processing the same starting pulp using 10 and 16% NaOH, respectively, for CCE (as in Examples 1 & 2). The pulps were recovered immediately after the cold caustic extraction stage by slurrying the centrifuge pulp cake in water with recovery on a Buchner funnel and rinsing to remove excess caustic. This was followed by reslurrying and acidification with dilute sulfuric acid to pH 2.5–3.0, recovery in a Buchner funnel, and numerous water rinses prior to sheeting and drying. The 10% NaOH control sample (Example 5) was recovered in about a 90.2% yield from starting stock, while the 16% NaOH control sample (Example 6) was recovered in about a 88.6% yield.

EXAMPLE 7

For comparative purposes the pulps prepared in the above examples were evaluated in low catalyst (1.4% $H_2SO_4$ activation) acetylation tests. The results along with those obtained on standard hardwood acetate grade pulp (Sulfatate-H-J), and a cotton linters pulp (CLP; Buckeye 2355—acetate grade CLP) are shown below in Table 1. Conditions were selected to require an esterification time in the 170–190 minute range. More highly reactive pulps require lower acetylation temperatures. However, none of the modified hardwood pulps required acetylation temperatures that were significantly different from that used to acetylate standard Sulfatate-H-J pulp. The cotton linters pulp required a significantly higher temperature than the hardwood acetate standard and the modified hardwood pulps of the invention, illustrating the slower reactivity of cotton linters as compared to wood cellulose pulps.

TABLE 1

|  | Modified Pulps | | | | Control Pulps | | Standard Hardwood Acetate | |
| --- | --- | --- | --- | --- | --- | --- | --- | --- |
|  | Ex. 1 | Ex. 2 | Ex. 3 | Ex. 4 | Ex. 5 | Ex. 6 | Pulp | CLP |
| % NaOH in CCE | 10 | 16 | 16 | 16 | 10 | 16 | — | — |
| % PO Treatment | 10 | 10 | 12.5 | 15 | — | — | — | — |
| % —OC$_3$H$_6$OH | 2.9 | 3.3 | 3.7 | 4.5 | — | — | — | — |
| Acetylation Temperature, °C. | 32 | 30 | 30 | 30 | 32 | 30 | 32 | 38 |
| Esterification Time, Min. | 180 | 176 | 164 | 146 | 160 | 125 | 180 | 196 |
| Triacetate Haze | 6.5 | 5.1 | 4.6 | 6.6 | 21.6 | 84.4 | 14.1 | 5.2 |
| Diacetate Haze | 12.4 | 10.1 | 5.8 | 8.7 | 36.1 | n.d.[a] | 24.1 | 7.2 |

[a] not determined.

What is claimed is:

1. A process for the preparation of cellulose acetate comprising:

mercerizing cellulosic material derived from hardwood in a caustic mercerizing solution to produce mercerized hardwood cellulose;

reacting the mercerized hardwood cellulose with an alkylene oxide hydroxyalkylating agent to a degree of substitution of the cellulose ranging from 0.04 to 0.15 to form a reactive mercerized hardwood cellulose, said degree of substitution being insufficient to render said mercerized hardwood cellulose appreciably soluble in water;

recovering said reactive substantially water insoluble mercerized hardwood cellulose and acetylating it at a temperature of at least about 30°C. to form cellulose acetate.

2. The process of claim 1, wherein the cellulosic material derived from hardwood is mercerized with a caustic solution of about 8 to 20 weight percent.

3. The process of claim 2, wherein the caustic solution is about 10 to 16 weight percent.

4. The process of claim 2, wherein the reacting of the mercerized hardwood cellulose with an alkylene oxide is carried out in the presence of a caustic solution of the same concentration as the mercerizing solution.

5. The process of claim 1, wherein the cellulosic material is hardwood cellulosic pulp.

6. The process of claim 1, wherein the degree of alkylene oxide substitution of the cellulose is from 0.05 to 0.09 moles of alkylene oxide per anhydroglucose unit in said cellulose material.

7. The process of claim 1, wherein the hydroxyalkylating agent is propylene oxide and the degree of substitution of propylene oxide per anhydroglucose unit is from 0.06 to 0.08.

8. The process of claim 1, wherein the cellulose acetate formed has a triacetate haze value not greater than about 6.5.

9. The process of claim 6, wherein the cellulose acetate formed has a triacetate haze value not greater than about 6.5.

10. The process of claim 7, wherein the cellulose acetate formed has a triacetate haze value not greater than about 6.5.

11. A process for the preparation of cellulose acetate comprising:

mercerizing cellulosic material derived from hardwood in a caustic mercerizing solution to produce mercerized hardwood cellulose, reacting the mercerized hardwood cellulose with an alkylene oxide hydroxyalkylating agent to a degree of substitution of the cellulose ranging from about 0.04 to about 0.09 to form a reactive mercerized hardwood cellulose, said degree of substitution being insufficient to render said mercerized hardwood cellulose appreciably soluble in water;

recovering said reactive substantially water insoluble mercerized hardwood cellulose and acetylating it to form cellulose acetate having a triacetate haze value not greater than about 6.5.

12. The process of claim 11, wherein the cellulosic material derived from hardwood is mercerized with a caustic solution of about 8 to 20 weight percent.

13. The process of claim 12, wherein the caustic solution is about 10 to 16 weight percent.

14. The process of claim 13, wherein the reacting of the mercerized hardwood cellulose with an alkylene oxide is carried out in the presence of a caustic solution of the same concentration as the mercerizing solution.

15. The process of claim 14, wherein the cellulosic material is hardwood cellulosic pulp.

* * * * *